US012586410B2

(12) United States Patent
Wu et al.

(10) Patent No.: US 12,586,410 B2
(45) Date of Patent: Mar. 24, 2026

(54) METHOD AND DEVICE FOR DYNAMIC RECOGNITION OF EMOTION BASED ON FACIAL MUSCLE MOVEMENT MONITORING

(71) Applicant: Air Force Medical University, Xi'an (CN)

(72) Inventors: Shengjun Wu, Xi+3 an (CN); Xufeng Liu, Xi+3 an (CN); Zhikang Zou, Xi+3 an (CN); Xuefeng Wang, Xi+3 an (CN); Xiang Xu, Xi+3 an (CN); Ping Wei, Xi+3 an (CN); Xiuchao Wang, Xi+3 an (CN); Hui Wang, Xi+3 an (CN); Peng Fang, Xi+3 an (CN); Kangning Xie, Xi+3 an (CN); Guoxin Li, Xi+3 an (CN); Minhua Hu, Xi+3 an (CN)

(73) Assignee: Air Force Medical University, Xi'an (CN)

( * ) Notice: Subject to any disclaimer, the term of this patent is extended or adjusted under 35 U.S.C. 154(b) by 247 days.

(21) Appl. No.: 18/498,027

(22) Filed: Oct. 30, 2023

(65) Prior Publication Data

US 2024/0062582 A1     Feb. 22, 2024

(30) Foreign Application Priority Data

Aug. 25, 2023    (CN) .......................... 202311080877.1

(51) Int. Cl.
*G06V 40/16*      (2022.01)
*G06V 10/26*      (2022.01)
*G06V 10/774*     (2022.01)

(52) U.S. Cl.
CPC ............ *G06V 40/176* (2022.01); *G06V 10/26* (2022.01); *G06V 10/774* (2022.01); *G06V 40/171* (2022.01)

(58) Field of Classification Search
CPC .... G06V 40/176; G06V 10/26; G06V 10/774; G06V 40/171; G06V 10/82; G06V 10/16;
(Continued)

(56) References Cited

U.S. PATENT DOCUMENTS

2006/0126928 A1 * 6/2006 Edwards ................. G06T 17/20
                                                                382/154
2007/0047768 A1 * 3/2007 Gordon ................... G06T 7/246
                                                                382/103
(Continued)

*Primary Examiner* — Wesley J Tucker

(57) ABSTRACT

The present disclosure provides a method and device for dynamic recognition of emotion based on facial muscle movement monitoring, including: obtaining muscle movement data on one side and continuous frame images on the other side; obtaining multiple emotional states related to emotions, associating each emotional state with its corresponding continuous frame images, associating each emotional state with the muscle movement data corresponding to the continuous frame images at the same location and at the same time, to form a training set, building an emotion recognition model; inputting the muscle movement data and continuous frame images obtained in real time into the emotion recognition model to obtain a corresponding emotional state. This method builds an emotion recognition model through muscle movement data and continuous frame image, and uses motion data to make up for the parts of small action images that cannot be collected, thereby obtaining accurate emotion detection results.

9 Claims, 5 Drawing Sheets

(58) Field of Classification Search
　　CPC ........ G06V 10/44; G06V 10/54; G06V 10/62;
　　　　　　　　　　　　　G06V 40/169; A61B 5/165
　　See application file for complete search history.

(56) References Cited

U.S. PATENT DOCUMENTS

| | | | |
|---|---|---|---|
| 2015/0042743 A1* | 2/2015 | Cullen | H04N 7/147 |
| | | | 348/14.02 |
| 2016/0275721 A1* | 9/2016 | Park | G06V 40/165 |
| 2016/0371569 A1* | 12/2016 | Palmer, III | G06V 40/168 |
| 2020/0302235 A1* | 9/2020 | Turcot | G06V 20/597 |
| 2021/0042503 A1* | 2/2021 | Karras | G06N 3/09 |
| 2021/0280322 A1* | 9/2021 | Frank | A61B 5/6803 |
| 2022/0369977 A1* | 11/2022 | Wang | G16H 70/20 |
| 2022/0392637 A1* | 12/2022 | Kollada | G16H 50/30 |
| 2023/0033776 A1* | 2/2023 | el Kaliouby | G16H 30/40 |
| 2023/0315810 A1* | 10/2023 | Högman | A61B 5/7267 |
| | | | 706/48 |
| 2025/0232612 A1* | 7/2025 | Farag | G06V 40/20 |

\* cited by examiner

METHOD AND DEVICE FOR DYNAMIC RECOGNITION OF EMOTION BASED ON FACIAL MUSCLE MOVEMENT MONITORING

CROSS-REFERENCE TO RELATED APPLICATION

This application claims priority to Chinese Patent Application No. 202311080877.1, filed on Aug. 25, 2023 before the China National Intellectual Property Administration, the disclosure of which is incorporated herein by reference in entirety.

TECHNICAL FIELD

The present disclosure relates to the field of intelligent analysis technology, and in particular to a method for dynamic recognition of emotion based on facial muscle movement monitoring and a device for dynamic recognition of emotion based on facial muscle movement monitoring.

BACKGROUND

Facial expressions are one of the basic ways for people to express their emotions. People express their inner feelings through different expressions in different situations. Facial expressions usually include happiness, sadness, anger, fear, surprise, disgust, etc. Different facial expressions can be expressed through characteristics of the facial muscle movement. Therefore, it is possible to understand a person's emotional or mental state through the recognition of facial expressions, which is of great significance to the detection of people's physical and mental health.

In medicine, emotion recognition may be used to learn about the status of infants and young children, learn about the growth of depressed children, monitor mental health, monitor the process of disease diagnosis and treatment, etc.

At present, emotion recognition usually identifies emotions by obtaining a face image and analyzing and processing a single static face image. However, it has shortcomings: since humans are rich in micro-expressions and the emotion is a dynamic process that takes a certain amount of time to appear, so accurate recognition of emotions cannot be achieved only by recognizing a single face image.

In order to solve the inaccuracy of identifying emotions only through a single face image, the combination of voice information or body information with face images has also emerged. That is, the combination of information at multiple levels can make up for the inaccuracy of identifying emotions only through a single face image.

However, for the emotion recognition applied in the medical field, it often can only determine the patient's emotional changes through facial tag recognition, because the patient may be inconvenient or unwilling to speak, voice information cannot be obtained, also, because the patient may have body or head damages so that he cannot move or is not convenient to move, it cannot obtain reliable body information. Therefore, for emotion recognition in the medical field, it is more reliable and commonly used to learn people's emotions through facial expression recognition alone.

When it is impossible to combine voice information or body information with human facial images to solve the problem of emotion recognition accuracy, there are also previous studies: combining multiple consecutive human facial images to analyze facial dynamic expressions. However, because the small change of muscle movement (or fast small expression) are often difficult to be captured or easy to be ignored when the face makes expression, there is also a time difference between adjacent frames of consecutive images, or the image differences are small and ignored when the face changes slightly, or small changes in facial muscle movement cannot be reliably obtained due to the influence of ambient light or obstructions, it results in the inability to obtain accurate facial expressions.

However, since people's emotions can only be obtained through facial expression recognition in the medical field, the facial expression recognition must have high accuracy. Medical treatment is serious and rigorous, it is necessary to improve the accuracy of facial expression recognition.

SUMMARY

Based on the technical problem of low accuracy of facial expression recognition in the prior art, embodiments of the present disclosure provide the following technical solutions:

The embodiments of the present disclosure provide a method for dynamic recognition of emotion based on facial muscle movement monitoring, comprising:

obtaining muscle movement data of a key area with a large amplitude of human facial expression movement on one side and continuous frame images of a key area with a large amplitude of human facial expression movement on the other side, and corresponding the muscle movement data and the continuous frame images to symmetrical key areas respectively;

obtaining multiple emotional states related to emotions, associating each emotional state with its corresponding continuous frame images, associating each emotional state with the muscle movement data corresponding to the continuous frame images at the same location and at the same time, to form a training set, building an emotion recognition model through the training set;

inputting the muscle movement data and continuous frame images obtained in real time into the emotion recognition model to obtain a corresponding emotional state, specifically comprising:

splicing the continuous frame images corresponding to each different key area, and extracting image feature data of spliced images of the key areas;

judging whether muscle changes have occurred in each key area based on changes in the image feature data;

if changes occur in all key areas, determining muscle change feature data of each key area based on the image feature data, and determining the corresponding emotional state based on a correspondence relationship between the muscle change feature data and the emotional state;

if one key area or multiple key areas have not changed, judging whether the muscle movement data at the same location and at the same time corresponding to a local area image that has not changed has changed: if it has changed, then converting the muscle movement data to corresponding muscle change feature data, and determining the corresponding emotional state based on the correspondence relationship between the muscle change feature data and the emotional state.

According to some embodiments of the present disclosure, the step of "obtaining muscle movement data of a key area with a large amplitude of human facial expression movement on one side" comprises:

attaching at least one three-dimensional displacement sensor to the key area with a large amplitude of human facial expression movement on the one side; and if the number of the three-dimensional displacement sensors is greater than 1, arranging one of the three-dimensional displacement sensors at a geometric center point of the key area with a large amplitude of human facial expression movement, and arranging the other three-dimensional displacement sensors on boundary lines of the key area with a large amplitude of human facial expression movement which has been reduced in the same proportion;

determining the muscle movement data of the key area based on displacement change information collected by all three-dimensional displacement sensors in the same key area, wherein the muscle movement data comprises muscle movement distances corresponding to time and position.

According to some embodiments of the present disclosure, the key area comprises a forehead area, eyebrow area, orbital area, cheek area, mouth corner area, jaw area and nose tip area of a face.

According to some embodiments of the present disclosure, the emotional state comprises a basic emotional state and a derived emotional state;

the basic emotional state comprises neutral, happy, sad, angry, fear, surprise or disgust state;

the derived emotional state comprises: multiple refined emotional states formed after weighting according to a degree of emotional expression and a time length of emotional expression, for each basic emotional state.

According to some embodiments of the present disclosure, the "multiple refined emotional states formed after weighting according to a degree of emotional expression and a time length of emotional expression, for each basic emotional state" specifically comprises:

each basic emotional state corresponds to multiple types of human facial images, and each type of human facial image corresponds to multiple continuous frames of human facial images;

the degrees of emotional expression of various key positions on a face of a basic emotional state are recorded as $a_1, a_2, a_3 \ldots a_i \ldots a_n$, and the corresponding time lengths of emotional expression are recorded as $b_1, b_2, b_3 \ldots b_i \ldots b_n$, and a numerical value corresponding to an emotional state quantification value is determined by the following formula:

$$\sum_{i=0}^{n} f_1 a_i \square M_i + f_2 \frac{b_i}{T_i} \square M_i$$

where $f_1$ is an influence factor of the degree of emotional expression on the emotional state, $f_2$ is an influence factor of the time length of emotional expression on the emotional state, n is a total number of key positions on the face, $T_i$ is the maximum time length of emotional expression of the i-th key position on the face, $M_i$ is the emotional state quantification value at the i-th key position on the face;

the corresponding basic emotional state is divided into multiple refined emotional states according to the numerical value corresponding to the emotional state quantification value.

According to some embodiments of the present disclosure, the step of "determining muscle change feature data of each key area based on the image feature data" comprises:

the image feature data comprises contour information and texture information corresponding to time and location;

the muscle change feature data comprises muscle change status, muscle change area and muscle change time;

the contour information and texture information in the same key area are analyzed, a muscle movement trend in the key area is determined and the muscle change status is determined, wherein the muscle change status comprises: contraction, stretching, jumping up and sinking;

according to the contour information and the texture information in the same key area, the maximum change boundary of contour and the maximum extension range of texture are determined, and the maximum facial expression change boundary is determined through the maximum change boundary of contour and the maximum extension range of texture; an area of a boundary area is calculated as the muscle change area;

the maximum time in the image feature data is used as the muscle change time.

According to some embodiments of the present disclosure, the step of "converting the muscle movement data to corresponding muscle change feature data" comprises:

the muscle movement data comprises muscle movement distances corresponding to time and position;

the muscle change feature data comprises muscle change status, muscle change area and muscle change time;

a muscle movement direction relative to a geometric center point of the key area with a large amplitude of human facial expression movement is determined through the muscle movement distances corresponding to different three-dimensional displacement sensors in the same key area; a muscle movement trend in the key area is determined based on all movement directions and the muscle change status is determined; wherein the muscle change status comprises: contraction, stretching, jumping up and sinking;

through the maximum value of the muscle movement distances and the muscle change status corresponding to different three-dimensional displacement sensors in the same key area, the maximum facial expression change boundary is determined, and an area of a boundary area is calculated as the muscle change area;

the maximum time in the muscle movement data is used as the muscle change time.

According to some embodiments of the present disclosure, the "an area of a boundary area is calculated" comprises:

griding the boundary area and making an area of each grid as a preset unit area;

calculating the number of grids and determining the area of the boundary area based on a product of the number and the unit area.

According to some embodiments of the present disclosure, the step of "determining the corresponding emotional state based on the correspondence relationship between the muscle change feature data and the emotional state" comprises:

conducting a comprehensive analysis of the muscle change status, muscle change area and muscle change time of each key area to determine comprehensive muscle change feature data of each key area and make it within a range of the muscle change feature data of the key area corresponding to a certain emotional state;

determining the emotional state based on the comprehensive muscle change feature data of each key area and a correspondence relationship between one emotional state and the range of the muscle change feature data at all key positions.

The embodiments of the present disclosure further provide a device for dynamic recognition of emotion based on facial muscle movement monitoring, comprising:

a first data acquisition assembly, configured for obtaining muscle movement data of a key area with a large amplitude of human facial expression movement on one side;

a second data acquisition assembly, configured for obtaining continuous frame images of a key area with a large amplitude of human facial expression movement on the other side;

a data mapping assembly, configured for corresponding the muscle movement data and the continuous frame images to symmetrical key areas respectively;

a model building assembly, configured for obtaining multiple emotional states related to emotions, associating each emotional state with its corresponding continuous frame images, associating each emotional state with the muscle movement data corresponding to the continuous frame images at the same location and at the same time, to form a training set, building an emotion recognition model through the training set;

wherein the emotion recognition model comprises:

a feature extraction assembly, configured for splicing the continuous frame images corresponding to each different key area, and extracting image feature data of spliced images of the key areas;

a judgment assembly, configured for judging whether muscle changes have occurred in each key area based on changes in the image feature data;

a first emotional state determination assembly, configured for, if changes occur in all key areas, determining muscle change feature data of each key area based on the image feature data, and determining the corresponding emotional state based on a correspondence relationship between the muscle change feature data and the emotional state;

a second emotional state determination assembly, configured for, if one key area or multiple key areas have not changed, judging whether the muscle movement data at the same location and at the same time corresponding to a local area image that has not changed has changed: if it has changed, then converting the muscle movement data to corresponding muscle change feature data, and determining the corresponding emotional state based on the correspondence relationship between the muscle change feature data and the emotional state.

Compared with the existing technology, the above-mentioned method and device for dynamic recognition of emotion based on facial muscle movement monitoring provided by the embodiments of the present disclosure have the following beneficial effects:

(1) When the emotional state is obtained only through facial information, the small changes of muscle movement are often difficult to be captured or easy to be ignored when the face makes expression in the existing technology. Therefore, based on the symmetry of facial expressions, the embodiments of the present disclosure can obtain the corresponding motion data and image date under one facial expression at the same time by acquiring the motion data (muscle movement data) of one side of the face and the image data of the other side of the face. Further, since the collection amount is limited when acquiring motion data through sensors, the processing process is complex, and the efficiency is low, the embodiments of the present disclosure mainly focus on image recognition of emotional states. When the image data is insufficient, the motion data is used to make up for it. In this way, it not only can obtain accurate emotion recognition results, but also improves processing efficiency.

(2) Conventional basic emotional states belong to broad categories, each basic emotional state is expressed in different degrees and in different time lengths, then its corresponding emotional state forms an independent emotional state. However, the existing technology does not consider classifying each category into detailed classification to obtain a more accurate emotional state. Based on this, the embodiments of the present disclosure refine the basic emotional state according to the degree of emotional expression and the time length of emotional expression, to form multiple refined derived emotional states. Correspondingly, when determining the muscle change feature data, not only the muscle change status is obtained, but also the muscle change area and the muscle change time are obtained at the same time, so as to accurately express the degree of emotional expression and the time length of emotional expression, and then combine the muscle change status, muscle change area and muscle change time to accurately obtain the various refined emotional states.

DETAILED DESCRIPTION OF EMBODIMENTS

In order to make the purpose, technical solutions and advantages of the present disclosure more clear, the present disclosure will be further described in detail below with reference to the drawings and embodiments. It should be understood that the specific embodiments described here are only intended to explain the present disclosure and will not be used to limit the present disclosure.

Embodiment 1

Figure 1:
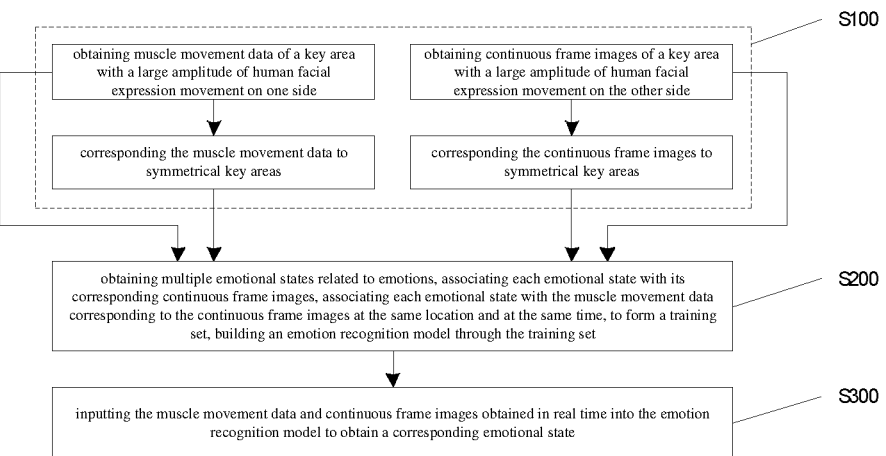
FIG. 1 is an overall schematic flowchart of a method for dynamic recognition of emotion based on facial muscle movement monitoring provided in one embodiment.

In one embodiment, a method for dynamic recognition of emotion based on facial muscle movement monitoring is provided. With reference to FIG. 1, the method includes the following steps:

Step S100: Since both sides of the face are symmetrical and their expressions are basically the same, the sensing values (motion monitoring data and image data) obtained from the corresponding positions on one side of the face can be applied to the other symmetrical side, thereby forming muscle movement data and continuous frame image data of the complete face. Specifically, the step includes: obtaining muscle movement data of a key area with a large amplitude of human facial expression movement on one side and continuous frame images of a key area with a large amplitude of human facial expression movement on the other side, and corresponding the muscle movement data and the continuous frame images to symmetrical key areas respectively.

For example, the key area in the embodiment of the present disclosure may include: a forehead area, eyebrow area, orbital area, cheek area, mouth corner area, jaw area, nose tip area, etc. of the face.

Herein, during image acquisition, due to factors such as ambient light, blocking, or shooting angle, the acquisition of facial images is inaccurate, and the accuracy of facial expression recognition will also change, thus affecting the accuracy of emotion recognition. Based on this, this embodiment can collect images through a camera device based on multiple angles and multiple scenes, to obtain an accurate and rich image data set, so that an accurate emotion recognition model can be built.

For "obtaining muscle movement data of a key area with a large amplitude of human facial expression movement on one side" in the step S100, the embodiments of the present disclosure also provide a better implementation, which can obtain accurate facial muscle movement data, specifically as follows:

(1) Set up three-dimensional displacement sensors, and in order to obtain accurate motion data, attach at least one three-dimensional displacement sensor to the key area with a large amplitude of human facial expression movement on the one side:

One case: if one three-dimensional displacement sensor is provided, then place it at a geometric center point of the key area with a large amplitude of human facial expression movement).

Another case: if the number of three-dimensional displacement sensors is greater than 1, then arrange one of the three-dimensional displacement sensors at a geometric center point of the key area with a large amplitude of human facial expression movement, and arrange the other three-dimensional displacement sensors on boundary lines of the key area with a large amplitude of human facial expression movement which has been reduced in the same proportion.

(2) Determine muscle movement data: determine the muscle movement data of the key area based on displacement change information collected by all three-dimensional displacement sensors in the same key area, wherein the muscle movement data comprises muscle movement distances corresponding to time and position.

Step S200: obtaining multiple emotional states related to emotions, associating each emotional state with its corresponding continuous frame images, associating each emotional state with the muscle movement data corresponding to the continuous frame images at the same location and at the same time, to form a training set, building an emotion recognition model through the training set.

Herein, the emotional state mentioned in the embodiments of the present disclosure includes two categories: a basic emotional state and a derived emotional state. The basic emotional state includes neutral, happy, sad, angry, fear, surprise and disgust in the usual sense. The description of the derived emotional state will be detailed in Embodiment 2. An emotional state, such as smiling, is a dynamic process and must contain multiple continuous frame images.

Figure 2:
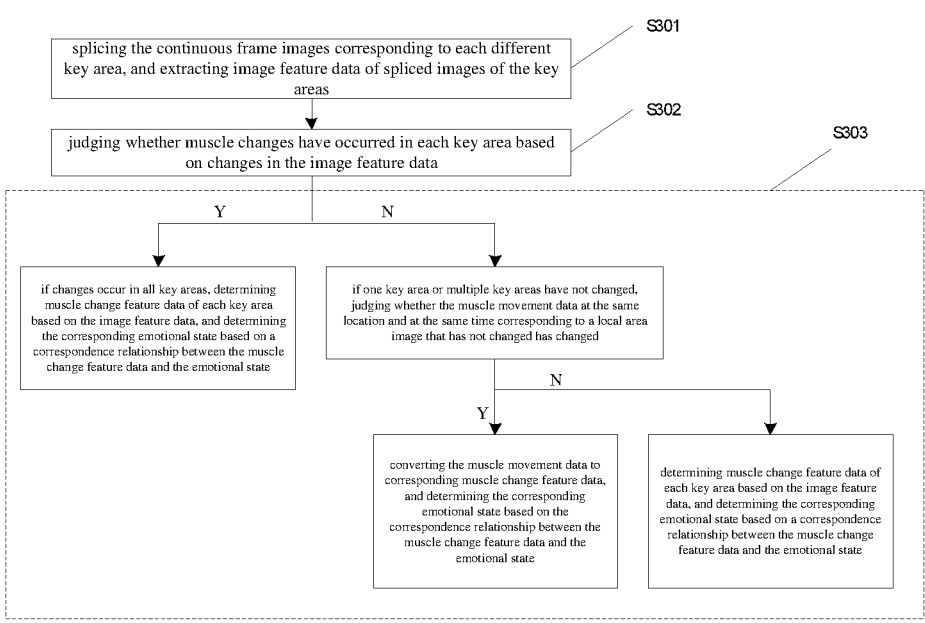
FIG. 2 is a schematic flowchart of the execution steps of the emotion recognition model provided in one embodiment.

Step S300: inputting the muscle movement data and continuous frame images obtained in real time into the emotion recognition model to obtain a corresponding emotional state, referring to FIG. 2, the specific steps include:

Step S301: splicing the continuous frame images corresponding to each different key area, and extracting image feature data of spliced images of the key areas. For example, the dynamic continuous frame images corresponding to the mouth corner area are spliced to form image data of the mouth corner area corresponding to a certain expression; other key areas are processed by using the same splicing method to form image data; and then the image feature data of each key area is extracted. The image feature data includes: expression-related information such as contour information and texture information corresponding to time and position.

Step S302: judging whether muscle changes have occurred in each key area based on changes in the image feature data. Changes in the image feature data of continuous frame images indicate muscle changes.

Step S303: the judgment results are divided into two cases:

The first case: if changes occur in all key areas, determining muscle change feature data of each key area based on the image feature data, and determining the corresponding emotional state based on a correspondence relationship between the muscle change feature data and the emotional state.

Herein, the step of "determining muscle change feature data of each key area based on the image feature data" includes:

the image feature data comprises contour information and texture information corresponding to time and location;

the muscle change feature data comprises muscle change status, muscle change area and muscle change time;

(1) the contour information and texture information in the same key area are analyzed, a muscle movement trend in the key area is determined and the muscle change status is determined, wherein the muscle change status comprises: contraction, stretching, jumping up and sinking;

(2) according to the contour information and the texture information in the same key area, the maximum change boundary of contour and the maximum extension range of texture are determined, and the maximum facial expression change boundary is determined through the maximum change boundary of contour and the maximum extension range of texture; an area of a boundary area is calculated as the muscle change area;

(3) the maximum time in the image feature data is used as the muscle change time.

The second case: if one key area or multiple key areas have not changed, judging whether the muscle movement data at the same location and at the same time corresponding to a local area image that has not changed has changed: if it has changed, then converting the muscle movement data to corresponding muscle change feature data, and determining the corresponding emotional state based on the correspondence relationship between the muscle change feature data and the emotional state.

Herein, the step of "converting the muscle movement data to corresponding muscle change feature data" comprises:

the muscle movement data comprises muscle movement distances corresponding to time and position;

the muscle change feature data comprises muscle change status, muscle change area and muscle change time;

(1) a muscle movement direction relative to a geometric center point of the key area with a large amplitude of human facial expression movement is determined through the muscle movement distances corresponding to different three-dimensional displacement sensors in the same key area; a muscle movement trend in the key area is determined based on all movement directions and the muscle change status is determined; wherein the muscle change status comprises: contraction, stretching, jumping up and sinking;

(2) through the maximum value of the muscle movement distances and the muscle change status corresponding to different three-dimensional displacement sensors in the same key area, the maximum facial expression change boundary is determined, and an area of a boundary area is calculated as the muscle change area;

(3) the maximum time in the muscle movement data is used as the muscle change time.

In order to obtain an accurate area of the irregular area, the above-mentioned method of calculating the area of the boundary area is: gridding the boundary area and making the area of each grid as a preset unit area; calculating the number of grids and determining the area of the boundary area based on the product of the number and the unit area.

In the step S303, the step of "determining the corresponding emotional state based on the correspondence relationship between the muscle change feature data and the emotional state" specifically includes:

(1) conducting a comprehensive analysis of the muscle change status, muscle change area and muscle change time of each key area to determine comprehensive muscle change feature data of each key area through big data comparison and make it within a range of the muscle change feature data of the key area corresponding to a certain emotional state;

(2) determining the emotional state based on the comprehensive muscle change feature data of each key area, a correspondence relationship between one emotional state and the range of the muscle change feature data at all key positions, and the data set.

Figure 4:
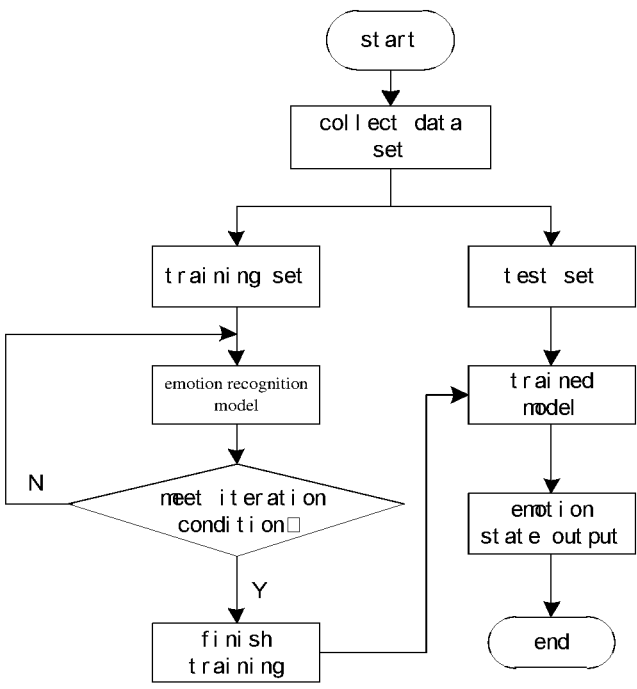
FIG. 4 is a schematic flowchart of the training and testing process of the emotion recognition model provided in one embodiment.

In addition, with the rapid development of deep learning technology, facial expression recognition based on deep learning can more accurately identify emotional states. Therefore, the embodiments of the present disclosure can use deep neural networks to build emotion recognition models, and then train and test emotion recognition models, as shown in FIG. 4. It is only a specific means of model construction, and of course it may also be implemented directly through computer sequential execution.

Based on the above technical solutions, the embodiments of the present disclosure build an emotion recognition model through muscle movement data and continuous frame image, and use motion data to make up for the parts of small action images that cannot be collected, thereby obtaining accurate emotion detection results.

Embodiment 2

Emotional categories in a general sense usually include several rough categories such as neutral, happy, sad, surprise, fear, angry, disgust, etc. However, these categories belong to broad categories. When the degree of expression is different and the time length is different, they are independent emotional states (different emotional states such as necessarily happy, small happiness, general happiness, special happiness, etc.). Therefore, the expression degree and duration of different types of emotions are also inseparable from human emotions. However, the existing technology does not consider classifying each category into detailed classification to obtain a more accurate emotional state. However, the existing technology does not consider classifying each category into detailed classification to obtain a more accurate emotional state.

Figure 3:
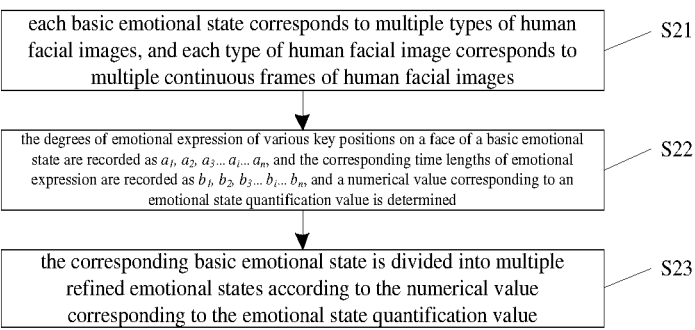
FIG. 3 is a schematic flowchart of the emotion refinement steps provided in one embodiment.

Based on this, on the basis of Embodiment 1, the embodiments of the present disclosure also provide the following technical solutions:

On the basis of the basic emotional states of neutral, happy, sad, anger, fear, surprise and disgust, a derived emotional state is formed, the derived emotional state includes: multiple refined emotional states formed after weighting according to a degree of emotional expression and a time length of emotional expression, for each basic emotional state. Referring to FIG. 3, the specific steps to form multiple refined emotional states include:

Step S21: each basic emotional state corresponds to multiple types of human facial images, and each type of human facial image corresponds to multiple continuous frames of human facial images.

Step S22: the degrees of emotional expression of various key positions on a face of a basic emotional state are recorded as $a_1, a_2, a_3 \ldots a_i \ldots a_n$, and the corresponding time lengths of emotional expression are recorded as $b_1, b_2, b_3 \ldots b_i \ldots b_n$, and a numerical value corresponding to an emotional state quantification value is determined by the following formula:

$$\sum_{i=0}^{n} f_1 a_i \Box M_i + f_2 \frac{b_i}{T_i} \Box M_i$$

where $f_1$ is an influence factor of the degree of emotional expression on the emotional state, $f_2$ is an influence factor of the time length of emotional expression on the emotional state, n is a total number of key positions on the face, $T_i$ is the maximum time length of emotional expression of the i-th key position on the face, $M_i$ is the emotional state quantification value at the i-th key position on the face.

Step S23: the corresponding basic emotional state is divided into multiple refined emotional states according to the numerical value corresponding to the emotional state quantification value.

Through the above technical solutions, the embodiments of the present disclosure performs a definite and quantitative refinement process on the basic emotional state according to the degree of emotional expression and the time length of emotional expression, thereby forming multiple derived emotional states. After the emotion refinement, a richer and more specific micro-expressions can be obtained, enabling a reliable determination of emotional states.

Figure 5:
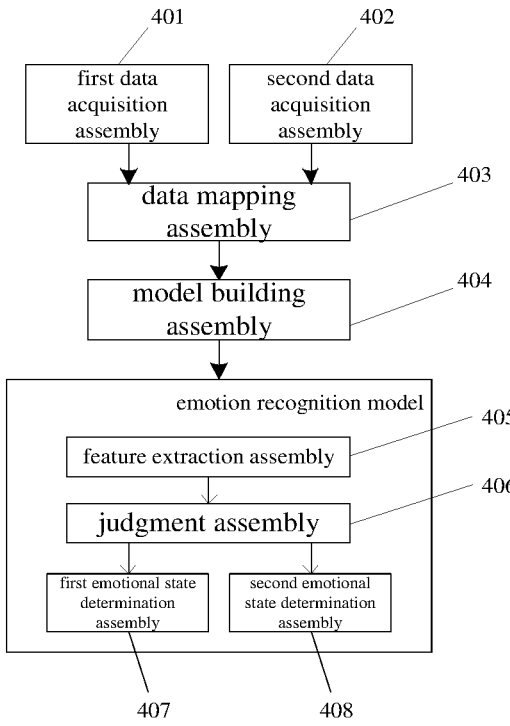
FIG. 5 is a schematic block diagram of a device for dynamic recognition of emotion based on facial muscle movement monitoring provided in one embodiment.

Based on the same inventive concept, the embodiments of the present disclosure also provide a device for dynamic recognition of emotion based on facial muscle movement monitoring, referring to FIG. 5, the device includes:

a first data acquisition assembly 401, configured for obtaining muscle movement data of a key area with a large amplitude of human facial expression movement on one side;

a second data acquisition assembly 402, configured for obtaining continuous frame images of a key area with a large amplitude of human facial expression movement on the other side;

a data mapping assembly 403, configured for corresponding the muscle movement data and the continuous frame images to symmetrical key areas respectively;

a model building assembly 404, configured for obtaining multiple emotional states related to emotions, associating each emotional state with its corresponding continuous frame images, associating each emotional state with the muscle movement data corresponding to the continuous frame images at the same location and at the same time, to form a training set, building an emotion recognition model through the training set;

wherein the emotion recognition model comprises:

a feature extraction assembly 405, configured for splicing the continuous frame images corresponding to each different key area, and extracting image feature data of spliced images of the key areas;

a judgment assembly 406, configured for judging whether muscle changes have occurred in each key area based on changes in the image feature data;

a first emotional state determination assembly 407, configured for, if changes occur in all key areas, determining muscle change feature data of each key area based on the image feature data, and determining the corresponding emotional state based on a correspondence relationship between the muscle change feature data and the emotional state;

a second emotional state determination assembly 408, configured for, if one key area or multiple key areas have not changed, judging whether the muscle movement data at the same location and at the same time corresponding to a local area image that has not changed has changed: if it has changed, then converting the muscle movement data to corresponding muscle change feature data, and determining the corresponding emotional state based on the correspondence relationship between the muscle change feature data and the emotional state.

For specific features of the device for dynamic recognition of emotion based on facial muscle movement monitoring, please refer to the features of the method for dynamic recognition of emotion based on facial muscle movement monitoring mentioned above, which will not be described again here.

The technical features of the above embodiments may be combined in any way. To simplify the description, not all possible combinations of the technical features in the above embodiments are described. However, as long as there is no contradiction in the combination of these technical features, all possible combinations should be considered to be within the scope of this specification.

What is claimed is:

1. A method for dynamic recognition of emotion based on facial muscle movement monitoring, comprising:

obtaining muscle movement data of a key area with a large amplitude of human facial expression movement on one side and continuous frame images of a key area with a large amplitude of human facial expression movement on the other side, and corresponding the muscle movement data and the continuous frame images to symmetrical key areas respectively;

obtaining multiple emotional states related to emotions, associating each emotional state with its corresponding continuous frame images, associating each emotional state with the muscle movement data corresponding to the continuous frame images at the same location and at the same time, to form a training set, building an emotion recognition model through the training set;

inputting the muscle movement data and continuous frame images obtained in real time into the emotion recognition model to obtain a corresponding emotional state, specifically comprising:

splicing the continuous frame images corresponding to each different key area, and extracting image feature data of spliced images of the key areas;

judging whether muscle changes have occurred in each key area based on changes in the image feature data;

if changes occur in all key areas, determining muscle change feature data of each key area based on the image feature data, and determining the corresponding emotional state based on a correspondence relationship between the muscle change feature data and the emotional state;

if one key area or multiple key areas have not changed, judging whether the muscle movement data at the same location and at the same time corresponding to a local area image that has not changed has changed: if it has changed, then converting the muscle movement data to corresponding muscle change feature data, and determining the corresponding emotional state based on the correspondence relationship between the muscle change feature data and the emotional state;

wherein the step of "obtaining muscle movement data of a key area with a large amplitude of human facial expression movement on one side" comprises:

attaching at least one three-dimensional displacement sensor to the key area with a large amplitude of human facial expression movement on the one side; and if the number of the three-dimensional displacement sensors is greater than 1, arranging one of the three-dimensional displacement sensors at a geometric center point of the key area with a large amplitude of human facial expression movement, and arranging the other three-dimensional displacement sensors on boundary lines of the key area with a large amplitude of human facial expression movement which has been reduced in the same proportion;

determining the muscle movement data of the key area based on displacement change information collected by all three-dimensional displacement sensors in the same key area, wherein the muscle movement data comprises muscle movement distances corresponding to time and position.

2. The method for dynamic recognition of emotion based on facial muscle movement monitoring according to claim 1, wherein the key area comprises a forehead area, eyebrow area, orbital area, cheek area, mouth corner area, jaw area and nose tip area of a face.

3. The method for dynamic recognition of emotion based on facial muscle movement monitoring according to claim 1, wherein the emotional state comprises a basic emotional state and a derived emotional state;

the basic emotional state comprises neutral, happy, sad, angry, fear, surprise or disgust state;

the derived emotional state comprises: multiple refined emotional states formed after weighting according to a degree of emotional expression and a time length of emotional expression, for each basic emotional state.

4. The method for dynamic recognition of emotion based on facial muscle movement monitoring according to claim 3, wherein the "multiple refined emotional states formed after weighting according to a degree of emotional expression and a time length of emotional expression, for each basic emotional state" specifically comprises:

each basic emotional state corresponds to multiple types of human facial images, and each type of human facial image corresponds to multiple continuous frames of human facial images;

the degrees of emotional expression of various key positions on a face of a basic emotional state are recorded as $a_1$, $a_2$, $a_3$ ... $a_i$ ... $a_n$, and the corresponding time lengths of emotional expression are recorded as $b_1$, $b_2$, $b_3$ ... $b_i$ ... $b_n$, and a numerical value corresponding to an emotional state quantification value is determined by the following formula:

$$\sum_{i=0}^{n} f_1 a_i \square M_i + f_2 \frac{b_i}{T_i} \square M_i$$

where $f_1$ is an influence factor of the degree of emotional expression on the emotional state, $f_2$ is an influence factor of the time length of emotional expression on the emotional state, n is a total number of key positions on the face, $T_i$ is the maximum time length of emotional expression of the i-th key position on the face, $M_i$ is the emotional state quantification value at the i-th key position on the face;

the corresponding basic emotional state is divided into multiple refined emotional states according to the numerical value corresponding to the emotional state quantification value.

5. The method for dynamic recognition of emotion based on facial muscle movement monitoring according to claim 1, wherein the step of "determining muscle change feature data of each key area based on the image feature data" comprises:

the image feature data comprises contour information and texture information corresponding to time and location;

the muscle change feature data comprises muscle change status, muscle change area and muscle change time;

the contour information and texture information in the same key area are analyzed, a muscle movement trend in the key area is determined and the muscle change status is determined, wherein the muscle change status comprises: contraction, stretching, jumping up and sinking;

according to the contour information and the texture information in the same key area, the maximum change boundary of contour and the maximum extension range of texture are determined, and the maximum facial expression change boundary is determined through the maximum change boundary of contour and the maximum extension range of texture; an area of a boundary area is calculated as the muscle change area;

the maximum time in the image feature data is used as the muscle change time.

6. The method for dynamic recognition of emotion based on facial muscle movement monitoring according to claim 1, wherein the step of "converting the muscle movement data to corresponding muscle change feature data" comprises:

the muscle movement data comprises muscle movement distances corresponding to time and position;

the muscle change feature data comprises muscle change status, muscle change area and muscle change time;

a muscle movement direction relative to a geometric center point of the key area with a large amplitude of human facial expression movement is determined through the muscle movement distances corresponding to different three-dimensional displacement sensors in the same key area; a muscle movement trend in the key area is determined based on all movement directions and the muscle change status is determined; wherein the muscle change status comprises: contraction, stretching, jumping up and sinking;

through the maximum value of the muscle movement distances and the muscle change status corresponding to different three-dimensional displacement sensors in the same key area, the maximum facial expression change boundary is determined, and an area of a boundary area is calculated as the muscle change area;

the maximum time in the muscle movement data is used as the muscle change time.

7. The method for dynamic recognition of emotion based on facial muscle movement monitoring according to claim 6, wherein the "an area of a boundary area is calculated" comprises:

griding the boundary area and making an area of each grid as a preset unit area;

calculating the number of grids and determining the area of the boundary area based on a product of the number and the unit area.

8. The method for dynamic recognition of emotion based on facial muscle movement monitoring according to claim 1, wherein the step of "determining the corresponding emotional state based on the correspondence relationship between the muscle change feature data and the emotional state" comprises:

conducting a comprehensive analysis of the muscle change status, muscle change area and muscle change time of each key area to determine comprehensive muscle change feature data of each key area and make it within a range of the muscle change feature data of the key area corresponding to a certain emotional state;

determining the emotional state based on the comprehensive muscle change feature data of each key area and a correspondence relationship between one emotional state and the range of the muscle change feature data at all key positions.

9. The method for dynamic recognition of emotion based on facial muscle movement monitoring according to claim 1, wherein the key area comprises a forehead area, eyebrow area, orbital area, cheek area, mouth corner area and nose tip area of a face.

* * * * *